(12) United States Patent
Park

(10) Patent No.: US 12,568,294 B2
(45) Date of Patent: Mar. 3, 2026

(54) CAMERA MODULE

(71) Applicant: SAMSUNG ELECTRO-MECHANICS CO., LTD., Suwon-si (KR)

(72) Inventor: Chuel Jin Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 190 days.

(21) Appl. No.: 18/447,592

(22) Filed: Aug. 10, 2023

(65) Prior Publication Data

US 2024/0107145 A1     Mar. 28, 2024

(30) Foreign Application Priority Data

Sep. 26, 2022   (KR) ........................ 10-2022-0121844
May 8, 2023   (KR) ........................ 10-2023-0059244

(51) Int. Cl.
H04N 23/55     (2023.01)
H04N 23/51     (2023.01)
H04N 23/54     (2023.01)

(52) U.S. Cl.
CPC ............. H04N 23/55 (2023.01); H04N 23/51 (2023.01); H04N 23/54 (2023.01)

(58) Field of Classification Search
CPC ........ H04N 23/51; H04N 23/54; H04N 23/55; H04N 23/57
See application file for complete search history.

(56) References Cited

U.S. PATENT DOCUMENTS

| | | | |
|---|---|---|---|
| 2017/0054883 A1* | 2/2017 | Sharma .................. | H04N 23/66 |
| 2018/0343370 A1 | 11/2018 | Park et al. | |
| 2020/0241387 A1 | 7/2020 | Seo et al. | |
| 2020/0301246 A1 | 9/2020 | Seo et al. | |
| 2020/0401014 A1* | 12/2020 | Seo ........................... | G03B 9/06 |
| 2020/0404127 A1* | 12/2020 | Zeng ...................... | G03B 17/38 |
| 2021/0041769 A1* | 2/2021 | Nakamura ........... | H04N 25/131 |

FOREIGN PATENT DOCUMENTS

| | | |
|---|---|---|
| KR | 10-2015-0019855 A | 2/2015 |
| KR | 10-1536172 B1 | 7/2015 |
| KR | 10-2018-0129586 A | 12/2018 |
| KR | 10-2020-0093997 A | 8/2020 |
| KR | 10-2020-0112158 A | 10/2020 |
| KR | 10-2020-0144259 A | 12/2020 |
| KR | 10-2313877 B1 | 10/2021 |

* cited by examiner

*Primary Examiner* — Amy R Hsu
(74) *Attorney, Agent, or Firm* — NSIP Law

(57)     ABSTRACT

A camera module is provided. The camera module includes a housing; a focusing unit accommodated in the housing, and configured to move in an optical axis direction and having a lens barrel therein; a stop caliber unit which has an aperture through which light incident to the lens barrel passes; and a stop adjusting unit connected to the stop caliber unit and configured to change a size of the aperture, wherein the stop caliber unit is configured to move relative to the stop adjusting unit in the optical axis direction.

20 Claims, 12 Drawing Sheets

10

I–I'

500

CAMERA MODULE

CROSS-REFERENCE TO RELATED APPLICATIONS

This application claims the benefit under 35 USC § 119(a) of Korean Patent Application Nos. 10-2023-0059244 filed on May 8, 2023, and 10-2022-0121844 filed on Sep. 26, 2022, in the Korean Intellectual Property Office, the entire disclosures of which are incorporated herein by reference for all purposes.

BACKGROUND

1. Field

The following description relates to a camera module.

2. Description of Related Art

Camera modules are being implemented in portable electronic devices such as, but not limited to, smartphones.

With regard to typical digital cameras, a mechanical stop may be provided to change an amount of incident light depending on a photographing environment. However, in a camera module used in a small-sized product such as a portable electronic device, it may be difficult to separately include a stop.

For example, since the weight of a camera module may be increased due to various components that drive a stop, autofocusing operations may be deteriorated. In other words, a stop module may act as a driving load to perform an autofocusing operation, such that a driving voltage for an autofocusing operation may increase.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a housing; a focusing unit accommodated in the housing, and configured to move in an optical axis direction, and having a lens barrel therein; a stop caliber unit which has an aperture through which light incident to the lens barrel passes; and a stop adjusting unit, connected to the stop caliber unit, and configured to change a size of the aperture, wherein the stop caliber unit is configured to move relative to the stop adjusting unit in the optical axis direction.

The stop caliber unit may be coupled to the focusing unit and is configured to move in the optical axis direction together with the focusing unit.

The focusing unit may move in the optical axis direction, movement of the stop adjusting unit is limited in the optical axis direction.

The stop adjusting unit may be provided to move relative to the stop caliber unit in a first direction perpendicular to the optical axis direction.

The stop adjusting unit may include a moving holder provided to move in the first direction and connected to the stop caliber unit, wherein, when the moving holder moves in the first direction, a size of the aperture changes.

The stop adjusting unit may include a holder driving magnet accommodated in the moving holder; and a holder driving coil, disposed to oppose the holder driving magnet, and configured to generate a driving force to the holder driving magnet in the first direction, wherein the moving holder may be configured to move in the first direction relative to the holder driving coil.

The stop caliber unit may include a rotating plate connected to the moving holder and configured to rotate; and a plurality of blades configured to rotate together with the rotating plate and configured to form the aperture with different sizes, and wherein, the rotating plate is configured to rotate when the moving holder moves in the first direction.

The rotating plate may include a rotating lever which extends in a direction toward the moving holder, wherein the moving holder may include a lever driving shaft that is configured to connect to an end of the rotating lever, and wherein the end of the rotating lever may be configured to move in the optical axis direction relative to the lever driving shaft.

The end of the rotating lever may be configured to move in the first direction together with the lever driving shaft.

The lever driving shaft may protrude upwardly in the optical axis direction, and wherein a lever hole, configured to accommodate at least a portion of the lever driving shaft in the optical axis direction, may be provided on the end of the rotating lever.

The camera module may further include a stop adjusting rolling groove comprising a housing rolling groove formed on a first surface of the housing opposing the moving holder, and a holder rolling groove formed on the moving holder to oppose the housing rolling groove; and a stop adjusting rolling member disposed in the holder rolling groove and configured to support a movement of the moving holder in the first direction, wherein the stop adjusting rolling member is in contact with the stop adjusting rolling groove at a minimum of three points.

A lower portion of the stop adjusting rolling member may be in contact with the holder rolling groove, such that a center of the stop adjusting rolling member overlaps the moving holder in the optical axis direction.

A cross-sectional surface of the holder rolling groove may have an "L" shape in the first direction, and the stop adjusting rolling member may be in two-point contact with the holder rolling groove.

The housing may include a holder guide groove provided to accommodate at least a portion of the moving holder in a second direction perpendicular to the first direction, and the holder guide groove may extend in the first direction along a movement path of the moving holder.

The housing may further include a holder guider provided below the holder guide groove and configured to support a lower portion of the moving holder, and the holder guider protrudes upwardly in the optical axis direction such that at least a portion of the holder guider is inserted into a lower portion of the moving holder, and the holder guider extends in the first direction along a moving radius of the moving holder and guides movement of the moving holder.

An electronic device may include the camera module.

In a general aspect, a camera module includes a housing; a stop caliber unit configured to move in an optical axis direction, which has an aperture through which incident light passes; and a stop adjusting unit, connected to the stop caliber unit, and configured to change a size of the aperture, wherein the stop caliber unit is configured to move relative to the stop adjusting unit in the optical axis direction.

The stop adjusting unit may be provided to move relative to the stop caliber unit in a first direction perpendicular to the optical axis direction to change a size of the aperture.

The stop caliber unit may include a rotating lever to change a size of the aperture, wherein the stop adjusting unit comprises a lever driving shaft configured to move in the first direction, wherein the lever driving shaft protrudes upwardly in the optical axis direction, and wherein a lever hole, configured to accommodate at least a portion of the lever driving shaft in the optical axis direction, is provided on the end of the rotating lever.

Other features and aspects will be apparent from the following detailed description, the drawings, and the claims.

Figure 1:
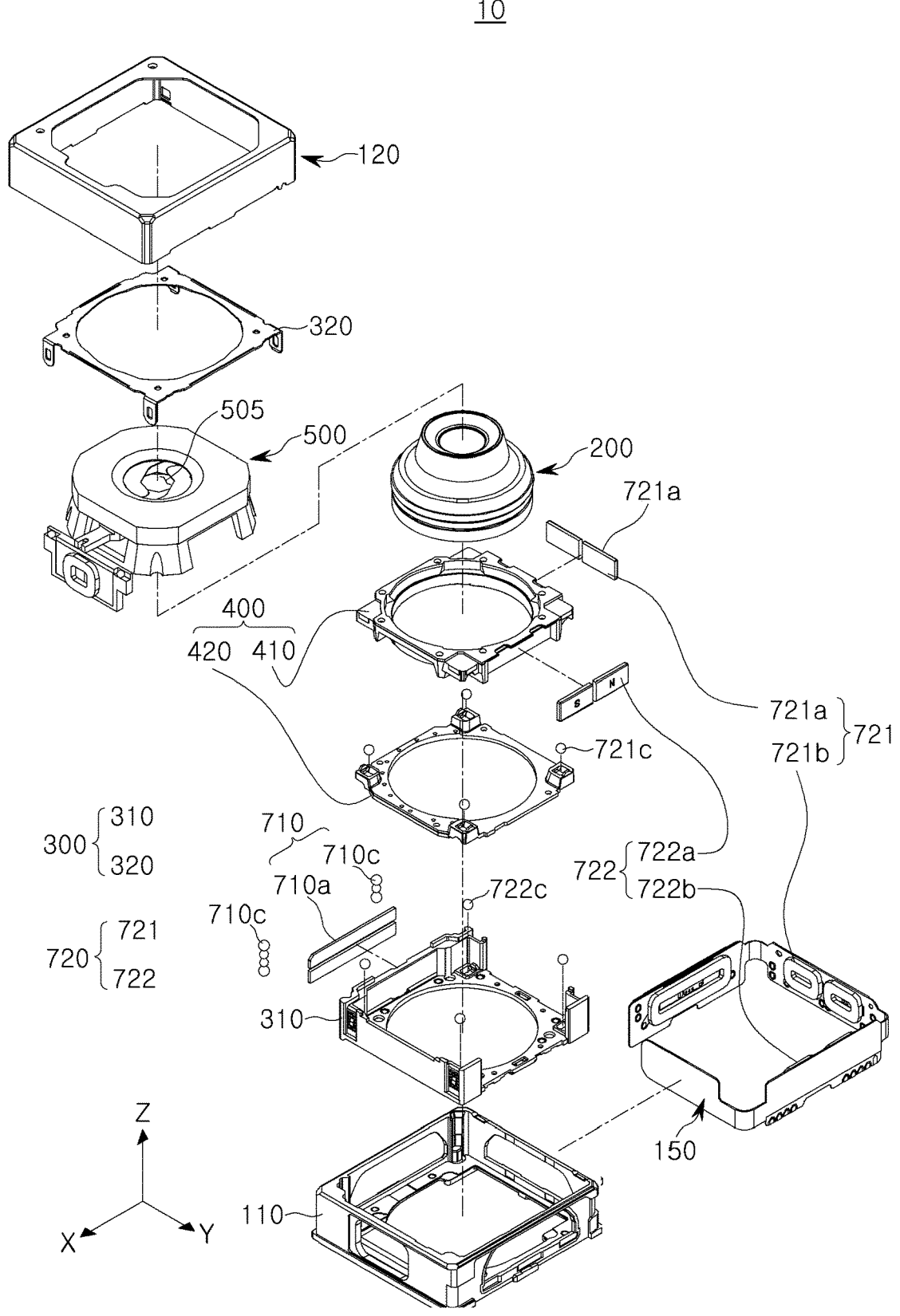
FIG. 1 illustrates a perspective diagram of an example camera module, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

In one or more examples, a camera module may reduce a driving load of an autofocusing operation caused by implementing a stop module.

In an example embodiment, a camera module may be mounted on an electronic device. In an example, the camera module may be mounted on a portable terminal, a laptop computer, a VR device, or glasses, as only examples. However, the electronic devices in which the camera module may be mounted are not limited to the aforementioned devices. For example, the camera module may be mounted on a portable electronic device such as a portable game machine.

A camera module according to an example embodiment may include a plurality of lens modules. For example, the camera module may include a first lens module and a second lens module configured to move in the optical axis direction. Additionally, the camera module may further include a housing configured to accommodate the first lens module and the second lens module.

The camera module may be configured to reduce movements of the first lens module and the second lens module due to external impacts. For example, the camera module may include elements configured to fix positions of the first lens module and the second lens module (in a non-driving state). As a specific example embodiment, a camera module may include a magnet and a yoke member. A magnet may be disposed on the first yoke member disposed in the housing and the second yoke member disposed in the housing, and in the non-driving state of the lens module, a position of the first lens module with respect to the housing and a relative position of the second lens module with respect to the first lens module may always be maintained to be constant.

The camera module configured as above may increase the range of focus shift by driving a plurality of lens modules in the optical axis direction, and may reduce movements of the lens modules due to external impacts.

Figure 2:
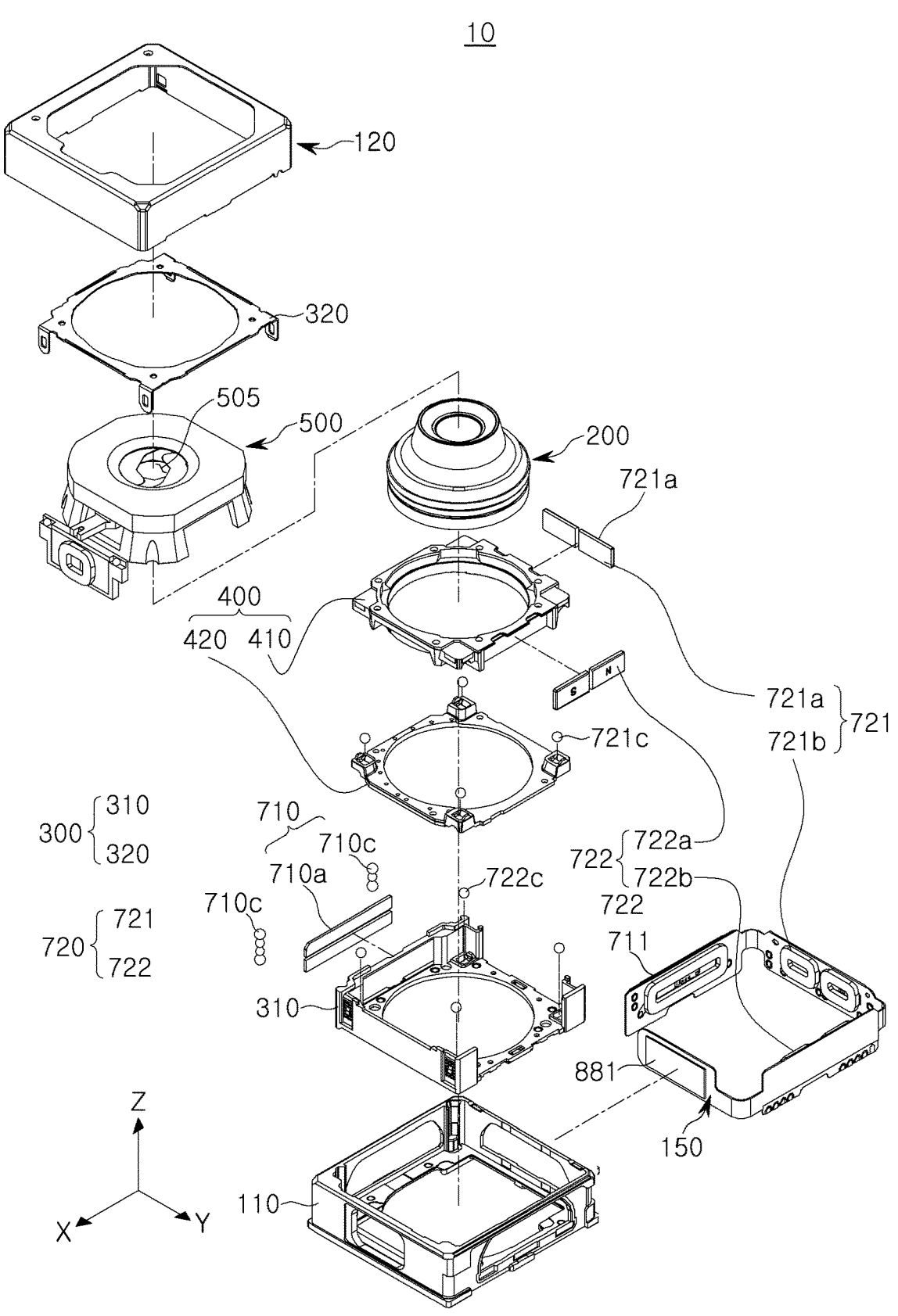
FIG. 2 illustrates an exploded perspective diagram of an example camera module, in accordance with one or more embodiments.

FIG. 1 illustrates a perspective diagram of an example camera module, in accordance with one or more embodiments. FIG. 2 illustrates an exploded perspective diagram of an example camera module, in accordance with one or more embodiments.

Referring to FIGS. 1 and 2 together, the camera module 10, in accordance with one or more embodiments, may accommodate a lens barrel 200 in which a plurality of lenses (not illustrated) are disposed, an image stabilization unit 400 that accommodates the lens barrel 200 and moves in a first direction perpendicular to the optical axis, a focusing unit 300 that accommodates the lens barrel 200 and the image stabilization unit 400, and moves in the optical axis direction (Z-axis direction), a stop module 500 that controls an amount of light incident to the lens barrel 200, and a housing 110 and a case 120 that accommodates the focusing unit 300.

In the lens barrel 200, a plurality of lenses (not illustrated) that image a subject may be accommodated, and the plurality of lenses may be arranged along an optical axis (Z-axis) in the lens barrel 200 and may be mounted on the lens barrel 200. The number of the plurality of lenses may be determined depending on an implementation of the lens barrel 200, and each lens may have optical characteristics such as the same refractive index or different refractive indexes.

In an example, the lens barrel 200 may be accommodated in the image stabilization unit 400 in the optical axis direction, the image stabilization unit 400 may be accommodated in the focusing unit 300, and the focusing unit 300 may be accommodated in order in the housing 110.

In an example, the housing 110 may have a substantially box shape which has an open upper portion, and the focusing unit 300 may be provided to move in an internal space of the housing in the optical axis direction. The image stabilization unit 400 may be accommodated in the focusing unit 300 to move in a direction perpendicular to the optical axis direction. The lens barrel 200 may be accommodated in the image stabilization unit 400.

The lens barrel 200 may be configured to move in the optical axis direction together with the focusing unit 300 in order to perform a focusing operation. The focusing driver unit 710, which will be described later, may move the focusing unit 300 in the optical axis direction, and in this example, the lens barrel 200 may move in the optical axis direction together with the focusing unit 300.

Additionally, the lens barrel 200 may be configured to move in a first direction perpendicular to the optical axis and in a second direction perpendicular to the optical axis and the first direction together with the image stabilization unit 400 for calibration of shaking of a user's hand.

In an example, the lens barrel 200 may move in the first direction and the second direction together with the image stabilization unit 400 based on an operation of an image stabilization driver unit 720 to be described later.

According to the example embodiment, the camera module 10 may include an image sensor (not illustrated) that converts light incident through the lens barrel 200 into an electrical signal.

The image sensor may be a device that converts light incident light through the lens barrel 200 into an electrical signal, and may be, as only examples, a charge coupled device (CCD) or a complementary metal-oxide semiconductor (CMOS).

An electrical signal converted by an image sensor may be output as an image through a display of a portable device.

In an example, the image sensor may be mounted on the substrate 150 and may be disposed below the optical axis direction of the housing 110.

Figure 3:
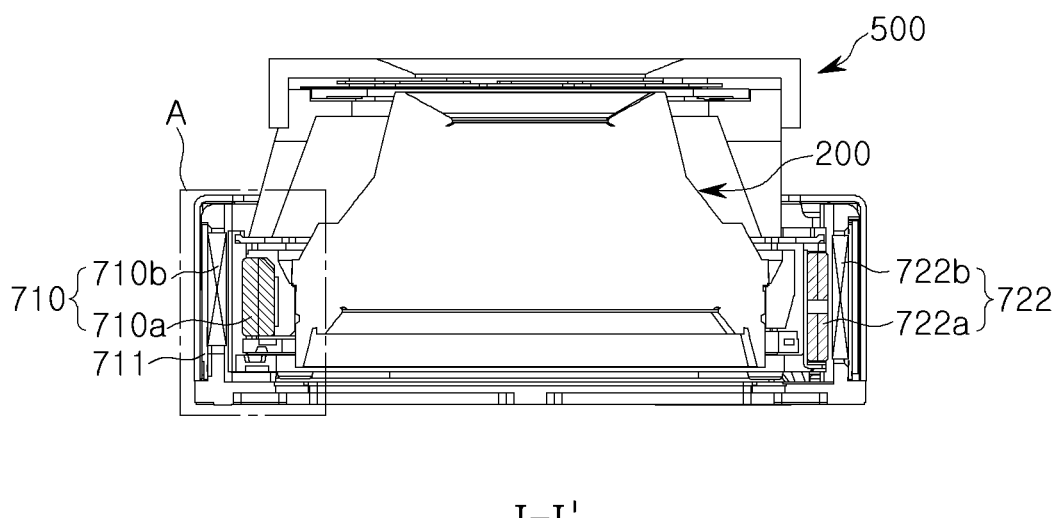
FIG. 3 illustrates a cross-sectional diagram illustrating taken along line I-I' in FIG. 1.

FIG. 3 illustrates a cross-sectional diagram taken along line I-I' in FIG. 1.

Figure 4:
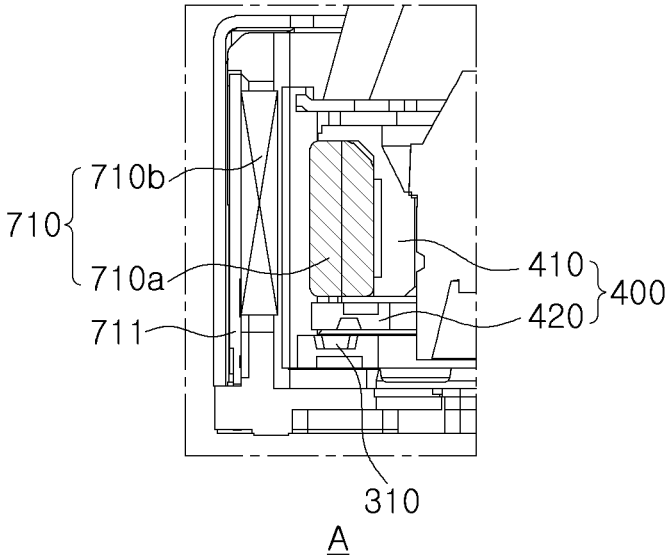
FIG. 4 illustrates an enlarged diagram illustrating portion A in FIG. 3.

Referring to FIGS. 3 and 4 together, a focusing driver unit 710 may include a focusing magnet 710a and a coil 710b that generate a driving force in the optical axis direction. Additionally, a position sensor (not illustrated), for example, a Hall sensor, may be provided to sense the optical axis direction position of the lens barrel 200.

The focusing magnet 710a and the focusing coil 710b may be arranged to oppose each other. In an example, a focusing magnet 710a may be mounted on a focusing unit 300, and a focusing coil 710b may be mounted on a housing 110 opposing the focusing unit 300 and may oppose each other.

Specifically, the focusing magnet 710a may be disposed on one surface of the focusing unit 300, the focusing coil 710b and a position sensor may be provided on a substrate 150 mounted on the housing 110, and may be disposed on one surface of the housing 110 facing the one surface of the focusing unit 300.

In the above structure, in the optical axis direction, the focusing magnet 710a may be configured as a moving member that moves together with the focusing unit 300, and the focusing coil 710b may be fixed to the housing, and may be referred to as a fixed member that does not move together with the focusing unit 300.

However, the mounting positions of the focusing magnet 710a and the focusing coil 710b are not limited to the above example as long as the focusing magnet 710a and the focusing coil 710b may generate an electromagnetic force to drive the focusing unit 300 in the optical axis direction.

When power is applied to the focusing coil 710b, the focusing unit 300 may move in the optical axis direction based on an electromagnetic force between the focusing magnet 710a and the focusing driver unit 710b. In this example, the position sensor may sense the optical axis direction position of the focusing unit 300.

The focusing unit 300 may include a carrier 310 in which the lens barrel 200 is accommodated and a carrier cover 320 that covers the carrier 310 in an upper portion in the optical axis direction.

Since the focusing unit 300 accommodates the lens barrel 200, when the focusing unit 300 moves in the optical axis direction based on an operation of the focusing driver unit 710, the lens barrel 200 may also move in the optical axis direction.

Additionally, in an example, since the lens barrel 200 is accommodated in the image stabilization unit 400 and the focusing unit 300 accommodates both the lens barrel 200 and the image stabilization unit 400, when the focusing unit 300 moves in the optical axis direction, the lens barrel 200 and the image stabilization unit 400 may also move in the optical axis direction together.

Figures 8A, 8B:
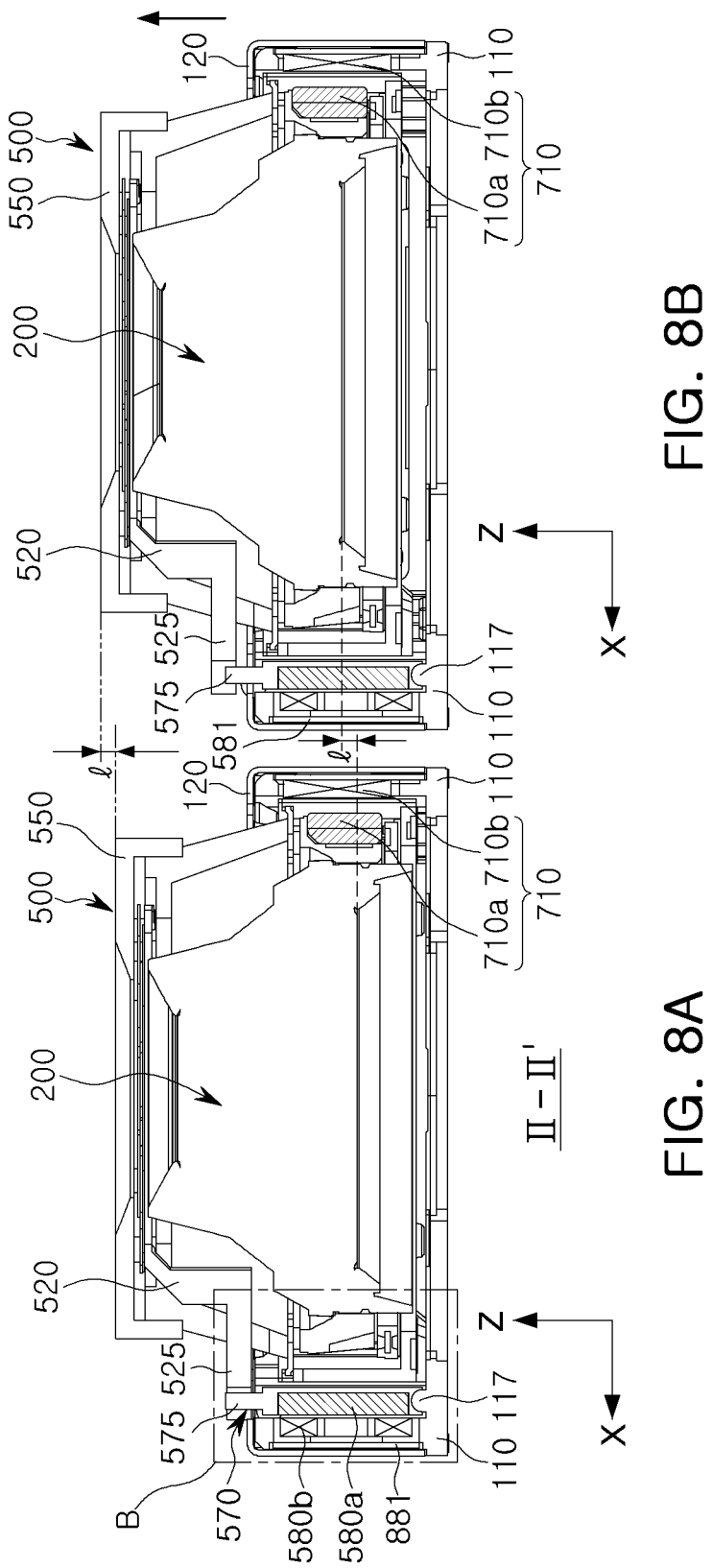
FIG. 8A illustrates a cross-sectional diagram taken along line II-II' in FIG. 7.
FIG. 8B illustrates a cross-sectional diagram of an example in which a focusing unit is moved from the state in FIG. 8A.

That is, when the focusing driver unit 710 operates, the focusing unit 300, the image stabilization unit 400, the lens barrel 200 and the stop caliber unit (not illustrated) of the stop module 500 may move together in the optical axis direction (see FIG. 8B).

When the focusing unit 300 moves, a focusing rolling member 710c may be disposed between the focusing unit 300 and the housing 110 to reduce friction therebetween. In an example, the focusing rolling member 710c may be configured as a ball bearing.

In an example, the focusing rolling member 710c may be disposed on both sides of the focusing magnet 710a (or the focusing coil 710b) to support a movement between the focusing unit 300 and the housing 110, and may reduce friction generated during movement.

Additionally, a driving yoke 711 may be mounted on the substrate 150. In an example, the driving yoke 711 may be arranged to oppose the focusing magnet 710a with the focusing coil 710b interposed therebetween.

Since an attractive force may act in a direction perpendicular to the optical axis direction between the driving yoke 711 and the focusing magnet 710a, the focusing rolling member 710c may maintain a contact with the focusing unit 300 and the housing 110 based on an attractive force between the yoke and the focusing magnet 710a.

Additionally, the driving yoke 711 may also operate to focus a magnetic force of the focusing magnet 710a. Accordingly, leakage magnetic flux may be prevented. In an example, the driving yoke 711 and the focusing magnet 710a may form a magnetic circuit.

To perform an image stabilization operation based on factors such as the shaking of a user's hand, the lens barrel 200 may move in a first direction perpendicular to the optical axis and in a second direction perpendicular to the optical axis and the first direction.

In an example, when shaking occurs due to the shaking of a user's hand during an image capture operation, the image stabilization unit 400 may compensate for (for example, may offset or correct) the shaking by giving a relative displacement corresponding to the shaking to the lens barrel 20.

The image stabilization unit 400 may accommodate the lens barrel 200. The image stabilization unit 400 in which the lens barrel 200 is accommodated may be accommodated in the focusing unit 300 in an upper portion in the optical axis direction. The image stabilization unit 400 may move relative to the focusing unit 300 in the first and second directions based on an operation of the image stabilization driver unit 720 to be described later.

That is, the image stabilization unit 400 may be accommodated in the focusing unit 300 and may move in the first direction and the second direction together with the lens barrel 200.

In an example, the image stabilization unit 400 may include a lens holder 410 which accommodates the lens barrel 200, and moves relative to the lens barrel 200 in the first direction with respect to the focusing unit 300, and a holder frame 420 which moves relative to the lens holder 410 and the focusing unit 300 together with the lens barrel 200 in the second direction.

The lens holder 410 may be driven by the image stabilization driver unit 720, specifically a first image stabilization driver unit 721 to be described later, and may move relative to the holder frame 420 and the focusing unit 300 in the first direction together with the lens barrel 200.

The holder frame 420 may be driven by an image stabilization driver unit 720, specifically a second image stabilization driver unit 722 to be described later, and may move relative to the lens holder 410 and the focusing unit 300 in the second direction together with the lens barrel 200.

In an example, a plurality of the image stabilization driver units 720 may be provided to generate driving forces in different directions to perform image stabilization. In an example, the image stabilization driver unit 720 may include a first image stabilization driver unit 721 that generates a driving force in the first direction and the second image stabilization driver unit 722 that generates a driving force in the second direction.

The lens holder 410 may move in the first direction based on an operation by the first image stabilization driver unit 721, and the holder frame 420 may move in the second direction based on an operation by the second image stabilization driver unit 722.

Each of the first and second image stabilization driver units 721 and 722 may include the first and second image stabilization magnets 721a and 722a and the first and second image stabilization coils 721b and 722b. Additionally, each of the first and second image stabilization driver units 721 and 722 may include a position sensor (not illustrated), for example, a Hall sensor.

Each of the first and second image stabilization magnets 721a and 722a may be disposed to oppose each of the first and second image stabilization coils 721b and 722b.

In an example, the first and second image stabilization magnets 721a and 722a may be mounted on the image stabilization unit 400, and the first and second image stabilization coils 721b and 722b may be provided on the substrate 150 mounted on the housing 110, respectively, and may be mounted on the housing 110 in a position opposing the image stabilization magnets 721a and 722a.

In this structure, the first or second image stabilization magnets 721a and 722b may be configured as moving members that move in the first or second direction together with the lens barrel 200 in the direction perpendicular to the optical axis, and the first or second image stabilization coils 721b and 722b may be configured as fixed members that are fixed to the housing 110.

However, the mounting positions of the first and second image stabilization magnets 721a and 722a and the first and second image stabilization coils 722a and 722b may generate an electromagnetic force to drive the image stabilization unit 400 in the first and second directions are not limited to the above positions.

When power is applied to the first image stabilization coil 721b, the lens holder 410, that is, the image stabilization unit 400, may move in the first direction based on an electromagnetic force between the first image stabilization magnet 721a and the first image stabilization coil 721b. In this example, the position sensor may sense the first direction position of the image stabilization unit.

Similarly, when power is applied to the second image stabilization coil 722b, the holder frame 420, that is, the image stabilization unit 400 may move in the second direction based on an electromagnetic force between the second image stabilization magnet 722a and the second image stabilization coil 722b. In this example, the position sensor may sense the second direction position of the image stabilization unit.

Since the lens barrel 200 may be mounted on the image stabilization unit 400, when the image stabilization unit 400 moves in the first and second directions, the lens barrel 200 may also move in the first and second directions. In this example, since the image stabilization unit 400 may be accommodated in the focusing unit 300, the image stabilization unit 400 and the lens barrel 200 mounted thereon may move relative to the focusing unit 300 in the first and second directions.

That is, through this structure, the image stabilization unit 400 may move relative to the focusing unit 300 along with the lens barrel 200 in the first and second directions and may offset the effects of shaking caused by the shaking of a user's hand.

Additionally, when the image stabilization unit 400 moves, an image stabilization rolling member (not illustrated) may be disposed between the image stabilization unit 400 and the focusing unit 300 to reduce friction therebetween. The image stabilization rolling member may be configured as a ball bearing.

The image stabilization rolling member may include a first image stabilization rolling member disposed between the lens holder 410 and the holder frame 420, to reduce friction when moving in the first direction and to perform a guiding operation in the first direction, and a second image stabilization rolling member disposed between the holder frame 420 and the focusing unit 300, to reduce friction when moving in the second direction and to perform a guiding operation in the second direction.

A printed circuit board on which an image sensor is mounted may be disposed below the housing 110.

The case 120 may be coupled to surround an external surface of the housing 110 and may protect internal components of the camera module. The case 120 may be coupled to the housing 110 to cover the external surface of the housing 110 and may protect internal components of the camera module.

In an example, the case 120 may shield electromagnetic waves, such that electromagnetic waves generated by the camera module 10 may not affect other electronic components in the portable device.

Since the portable device includes various electronic components other than the camera module 10, the case 120 may shield electromagnetic waves such that electromagnetic waves generated by the electronic components may not affect the camera module.

The case 120 may be formed of a metal material and may be grounded to a ground pad provided on the printed circuit board, thereby shielding electromagnetic waves.

The stop module 500 may be configured as a device configured to selectively change the amount of light incident to the lens barrel 200.

Figure 5:
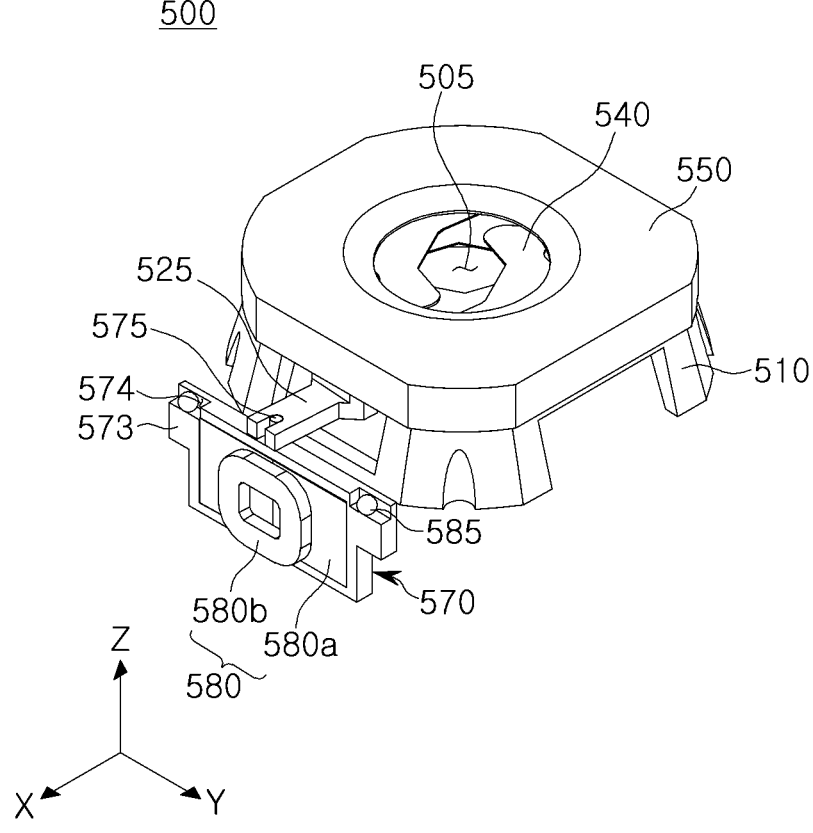
FIG. 5 illustrates a perspective diagram of a stop module, in accordance with one or more embodiments.

Referring to FIG. 5, in an example, in the stop module 500, a plurality of blades 540 may be driven by a stop adjusting unit such that apertures 505 of different sizes may be consecutively implemented. A user may form one of the apertures 505 having various sizes based on a determined photographing environment, light may be incident to the lens barrel 200 through the hole.

Figure 6:
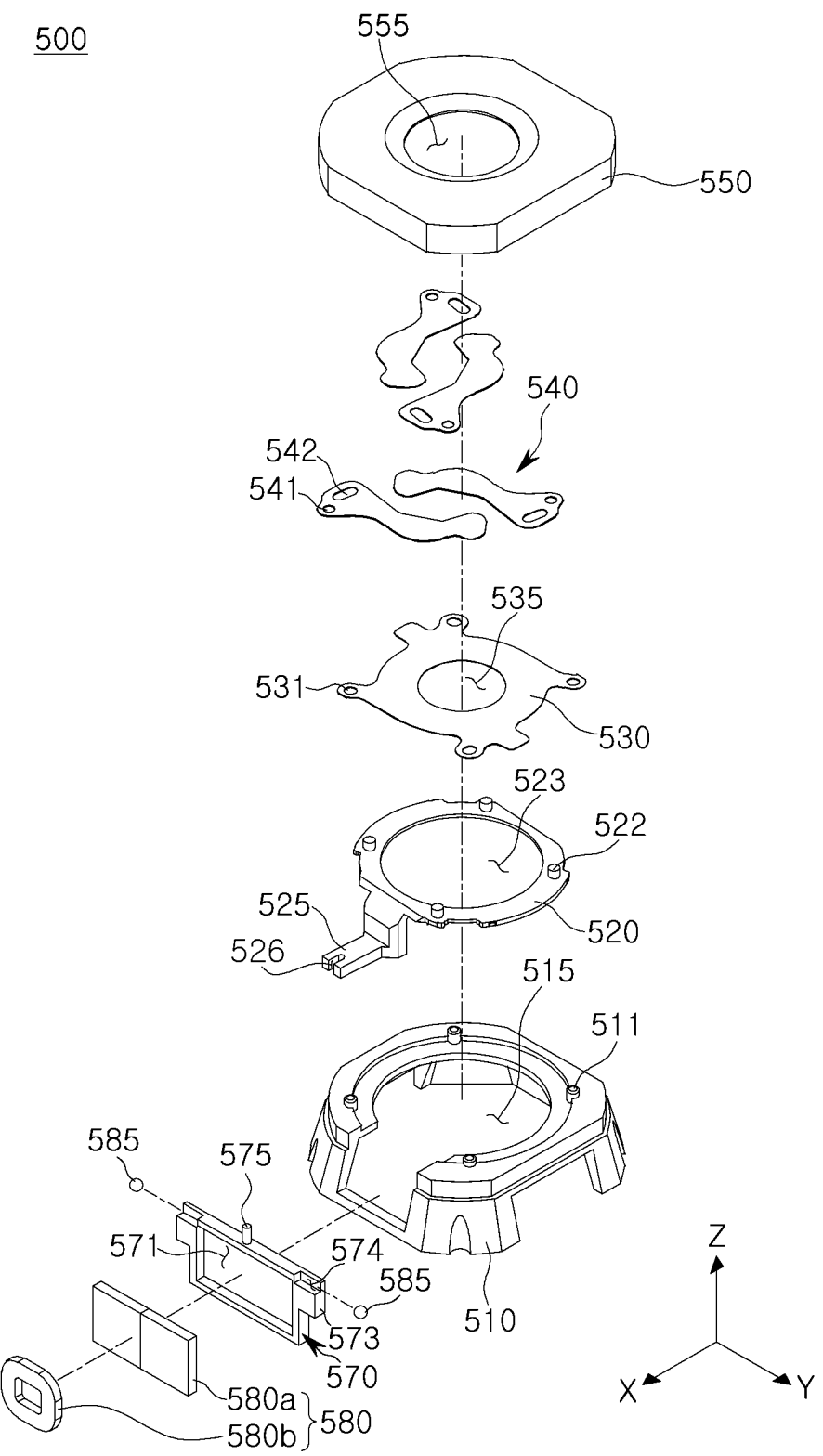
FIG. 6 illustrates an exploded perspective diagram of a stop module, in accordance with one or more embodiments.

FIG. 5 is a perspective diagram illustrating the stop module 500, in accordance with one or more embodiments. FIG. 6 is an exploded perspective diagram illustrating a stop module, in accordance with one or more embodiments.

The stop module 500, in accordance with one or more embodiments, may include a stop caliber unit including an aperture 505 and a stop adjusting unit configured to change a size of the aperture 505.

Referring to FIG. 5 and FIG. 6 together, the stop caliber unit may include a base 510, a rotating plate 520 having a ring shape, and seated on the base 510 to rotate, a plurality of blades 540 that rotate based on a movement by the rotating plate 520, and a stop cover 550 that covers an upper portion of the plurality of blades 540 in the optical axis direction. Additionally, the stop caliber unit may further include a stop spacer 530 disposed between the plurality of blades 540 and the rotating plate 520, or between the plurality of blades 540 and the stop cover 550 to allow the plurality of blades 540 and adjacent members to be spaced apart from each other.

The stop caliber unit may be disposed above the lens barrel 200 in the optical axis direction, that is, on a front side of the lens barrel 200 with respect to a path through which light is incident.

The base 510, the rotating plate 520, the spacer 530, the plurality of blades 540 and the base cover 550 may be disposed in order in the optical axis direction.

Additionally, at least a portion of the cover hole 555 provided in the stop cover 550, the spacer hole 535 provided in the stop spacer 530, the plate hole 523 of the rotating plate 520 and the base hole 515 provided in the base 510 may be disposed to overlap the aperture 505. By this structure, light passing through the aperture 505 may be incident to the lens barrel 200.

The base 510 may provide a space in which the rotating plate 520 is seated to rotate. The base 510 may be coupled to a carrier cover 320 that covers the focusing unit 300, specifically, the carrier 310 that accommodates the lens barrel 200 in an upper portion in the optical axis direction.

The stop cover 550 may be coupled to the base 510 above the plurality of blades 540 in the optical axis direction.

The stop spacer 530 may be provided with an accommodation hole 531 into which a blade shaft 511 is inserted, and may be coupled to the base 510. A plurality of accommodation holes 531 may be provided such that, even when the plurality of blades 540 rotate, the base 510 may not rotate.

The rotating plate 520 may have a ring shape having a plate hole 523 and may be disposed to rotate on the base 510. The rotating plate 520 may include a rotating lever 525 that extends in a radial direction, and is connected to a stop adjusting unit. The rotating plate 520 may be connected to the stop adjusting unit through the rotating lever 525 and may rotate based on the stop adjusting unit.

In an example, a plurality of blades 540 may form an aperture 505. A plurality of blades 540 may be arranged in a circumferential direction in the rotating plate 520, and in this example, surfaces opposing a center of the plurality of blades may define the aperture 505. With regard to the plurality of blades 540, the size of the aperture 505 may change according to each arrangement angle of the plurality of blades 540.

As illustrated in FIG. 6, the plurality of blades 540 may be configured to have various shapes such as, but not limited to, a boomerang shape or a linear line as long as the plurality of blades 540 may have a structure in which surfaces opposing a center may merge to form the aperture 505.

In other words, it may be sufficient that the aperture 505 may be formed by an arrangement between the plurality of blades 540. That is, as illustrated in FIG. 6, in an example, the entirety of the plurality of blades 540 may have the same shape, or, in an example, at least one of the plurality of blades 540 may have a different shape from a shape of other blades of the plurality of blades 540.

In FIG. 6, four blades 540 may be provided, such that the blades 540 may be stacked in two layers in two pairs, but an example embodiment thereof is not limited thereto, and even when more or fewer blades than four blades are applied, the example embodiment may be applied as long as the aperture may be formed.

The plurality of blades 540 may include a blade hole 541 into which a blade shaft 511 that protrudes upwardly in the optical axis direction from the base 510 may be inserted. The number of the blade shafts 511 may be configured to be as many as the plurality of blades 540. Since the base 510 may be coupled to the focusing unit 300, and may not rotate, such that each of the plurality of blades 540 may provide a rotating shaft.

Additionally, the plurality of blades 540 may further include guide holes 542 into which guide axes or protrusions 522 that protrude upwardly in the optical axis direction from the rotating plate 520 are inserted. The number of the guide axis 522 may be configured as many as the number of the blades 540. In an example, the guide hole 542 may be provided in an oval shape or a slit shape to be guided by the guide axis 522.

The rotating lever 525 of the rotating plate 520 may be connected to the moving holder 570 of the stop adjusting unit. Accordingly, the rotating plate 520 may rotate based on an operation by the stop adjusting unit.

When the rotating plate 520 rotates in a state in which the guide axis 522 is inserted into the guide hole 542, each of the plurality of blades 540 may be driven by the guide axis 522 inserted into the guide hole 542, and may rotate with respect to the blade shaft 441. Through the rotation of the plurality of blades 540, the size of the aperture 505 may be changed (see FIG. 10).

That is, each of the plurality of blades 540 may rotate around the blade shaft 511 based on the guide axis 522, and in this example, the shape of the surfaces opposing the center of the plurality of blades 540 may be changed such that the size of the aperture 505 may be changed.

The stop adjusting unit may include a moving holder 570 connected to the rotating plate 520 that rotates the rotating plate 520, and a holder driving unit 580 that drives the moving holder 570 in a direction perpendicular to the optical axis.

The stop caliber unit may be disposed above the lens barrel 200 (in front of the light incident path) in the optical axis direction. Additionally, during a focusing operation, the focusing unit 300 may move in the optical axis direction, and the lens barrel 200 accommodated therein may also move.

In the example in which the stop caliber unit is fixed and only the lens barrel 200 moves during focusing, a distance between the aperture 505 of the stop caliber unit and the lens barrel 200 may change. When the distance between the aperture 505 and the lens barrel 200 changes, the F value may change slightly, and the lens barrel 200 may collide with the stop caliber unit while moving upwardly in the optical axis direction.

Accordingly, in the camera module 10, in accordance with one or more embodiments, the stop caliber unit provided with the aperture 505 may move together with the focusing unit 300 in the optical axis direction. In an example, the stop caliber unit may be coupled to the focusing unit 300.

As described above, during a focusing operation, the stop caliber unit of the stop module 500 and the lens barrel 200 may move in the optical axis direction together with the focusing unit 300, such that the distance between the aperture of the stop module 500 and the lens barrel 200 may be maintained to be constant.

When the focusing unit 300 moves in the optical axis direction, and the stop caliber unit and the stop adjusting unit of the stop module 500 move in the optical axis direction together, the load of the focusing driver unit 710 that drives the focusing unit 300 in the optical axis direction may increase such that power consumption may increase.

Specifically, to maintain the distance between the aperture 505 and the lens barrel 200 constant, when the stop caliber unit and the stop adjusting unit move together when the focusing unit 300 moves, the load of the focusing driver unit 710 that drives the focusing unit 300 may be increased.

Accordingly, the stop module 500, in accordance with one or more embodiments, may include a stop caliber unit and a stop adjusting unit which have an aperture separately in the optical axis direction, such that, in the camera module structure including a stop module, the focusing operation may be implemented with a relatively low driving voltage.

Figure 7:
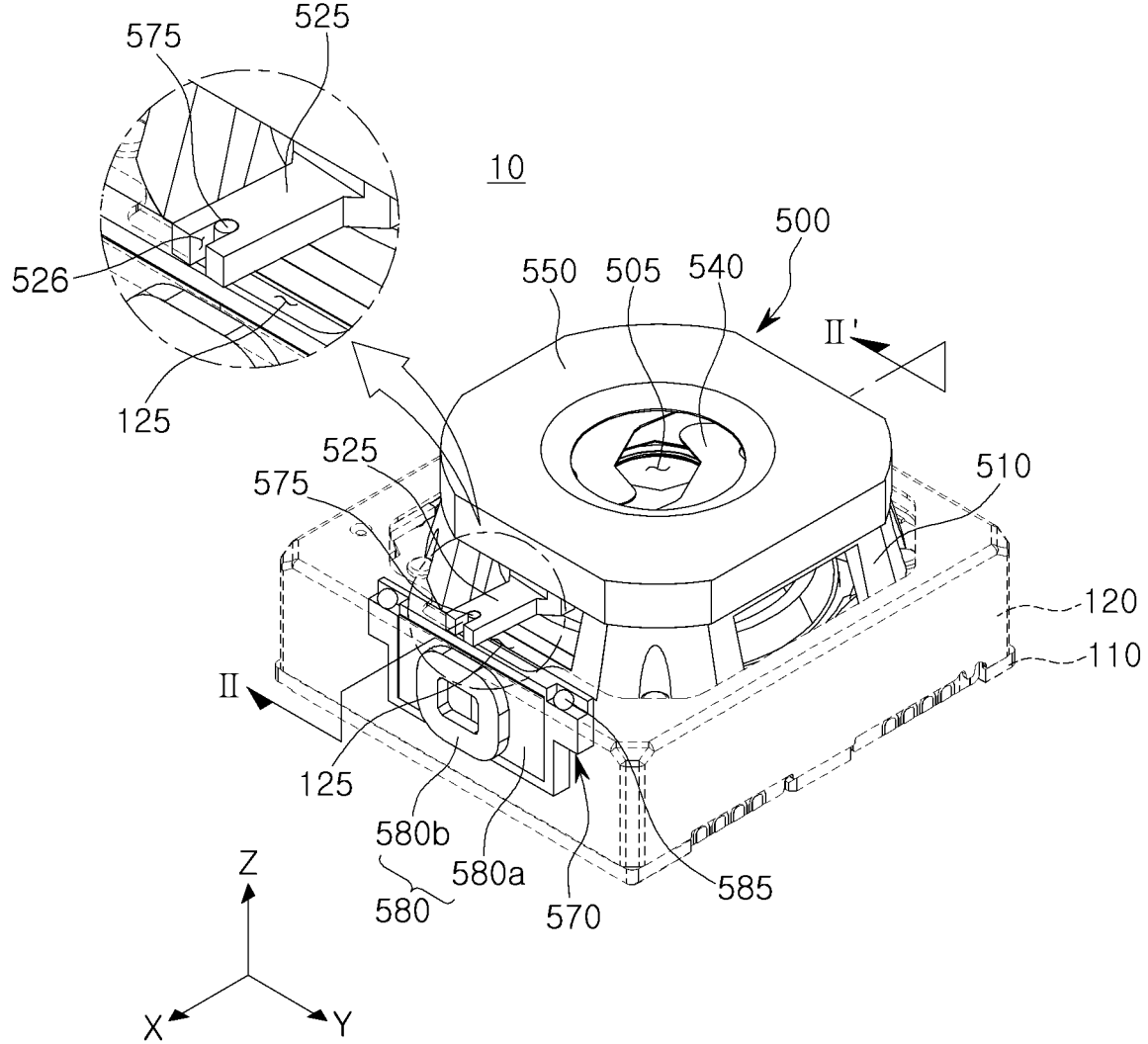
FIG. 7 illustrates a perspective diagram of a structure in which a stop caliber is connected to a stop adjustment unit, in accordance with one or more embodiments.

FIG. 7 is a perspective diagram illustrating a structure in which a stop caliber is connected to a stop adjustment unit, in accordance with one or more embodiments.

Referring to FIG. 7, in the stop module 500, in accordance with one or more embodiments, a stop caliber unit (including 510, 520, 540, and 550), and a stop adjusting unit (including 570 and 580) may move relative to each other in the optical axis direction.

In an example, the stop caliber unit may be connected to the stop adjusting unit to move relative thereto in the optical axis direction.

That is, since only the stop caliber unit moves in the optical axis direction when the focusing unit 300 moves in the optical axis direction, the driver load during a focusing operation may be reduced.

In the stop module 500, in accordance with one or more embodiments, the stop caliber unit may be coupled to the focusing unit 300, and may move in the optical axis direction together with the focusing unit 300, and the stop adjusting unit may be coupled to the housing 110 and may not move with the focusing unit 300.

Additionally, when the moving holder 570 moves in a direction perpendicular to the optical axis, the size of the aperture 505 may change (see FIG. 10).

In other words, the stop caliber unit and the stop adjusting unit may be connected to each other to move relative to each other in the optical axis direction, and may be connected to each other such that the size of the aperture 505 may be adjusted when the moving holder 570 of the stop adjusting unit moves in the direction perpendicular to the optical axis.

In an example, referring to the partially enlarged diagram on the left side in FIG. 7, the moving holder 570 may include a lever driving shaft 575 that protrudes upwardly in the optical axis direction.

In this example, the end of the rotating lever 525 may be connected to the lever driving shaft 575 so as to move relative thereto in the optical axis direction. In an example, a lever hole 526, that accommodates the lever driving shaft 575 in the optical axis direction, may be provided on the end of the rotating lever 525, and the rotating lever 525 and the lever driving shaft 575 may be connected to each other.

Accordingly, the stop caliber unit may move relative to the stop adjusting unit in the optical axis direction.

Through this structure, the rotating lever 525 and the moving holder 570 may be provided to be able to move relative to each other in the optical axis direction, and when the moving holder 570 moves in a direction perpendicular to the optical axis, the rotating plate 520 may rotate, and accordingly, the plurality of blades 540 may rotate such that the size of the aperture 505 may be changed (see FIG. 10).

In an example, the moving holder 570 may be disposed in the housing 110 to move in a direction perpendicular to the optical axis, may be disposed between the housing 110 and the focusing unit 300, and may move in a direction perpendicular to the optical axis.

The case 120 may include a recess 125 that is formed by recessing an upper surface, such that the lever driving shaft 575 may protrude upwardly through the recess 125 and may be connected to the rotating lever 525.

FIG. 8A is a cross-sectional diagram illustrating taken along line II-II' in FIG. 7. FIG. 8B is a cross-sectional diagram illustrating an example in which a focusing unit is moved from the example in FIG. 8A.

Referring to FIG. 8A and FIG. 8B together, when the focusing unit 300 moves in the optical axis direction based on an operation by the focusing driver unit 710 during focusing in the camera module 10 according to the example embodiment, the stop caliber unit provided in the focusing unit 300 may also move in the optical axis direction.

When the focusing driver unit 710 is driven to perform a focusing operation, the focusing unit 300 may move in the optical axis direction. Since the focusing unit 300 accommodates the lens image stabilization unit 400 and the image stabilization unit 400 accommodates the lens barrel 200, when the focusing unit 300 moves in the optical axis direction, the lens barrel 200 may also move in the optical axis direction.

The stop caliber unit may be coupled to a moving member (one of the focusing unit 300, the image stabilization unit 400, and the lens barrel 200) in the optical axis direction, and may move in the optical axis direction together with the focusing unit 300 during a focusing operation.

That is, when the focusing unit 300 moves in the optical axis direction to perform a focusing operation, the image stabilization unit 400, the lens barrel 200 and the stop caliber unit may also move in the optical axis direction.

Additionally, the stop adjusting unit may be coupled to the fixed member (one of the housing 110 and the case 120) in the optical axis direction, such that a height of the optical axis direction may be maintained to be constant regardless of the focusing operation.

In an example, the stop caliber unit may be mounted on a carrier cover 320 covering the carrier 310 of the focusing unit 300, and the stop adjusting unit may be provided on the housing 110.

In this example, since the stop caliber unit and the stop adjusting unit are connected to each other such that the stop caliber unit and the stop adjusting unit may move relative to each other in the optical axis direction, when the focusing unit 300 moves in the optical axis direction, the stop caliber unit may move relative to the stop adjusting unit together with the focusing unit 300 in the optical axis direction.

That is, when the focusing unit 300 is driven, the focusing unit 300 and the stop caliber unit may move relative to the stop adjusting unit in the optical axis direction together.

Additionally, the stop caliber unit may move by the same distance as a distance of the focusing unit 300 in the optical axis direction. That is, a traveling distance I of the stop caliber unit may be the same as the moving distance of the focusing unit 300.

In this example, when the focusing unit 300 is driven, the distance between the aperture 505 of the stop caliber unit and the lens barrel 200 may be constant.

The stop caliber unit and the stop adjusting unit may not be limited to the specific coupling positions described above, and any structure in which the stop caliber unit may move relative to the stop adjusting unit in the optical axis direction together with the focusing unit 300 may be included in example embodiments.

Figure 9:
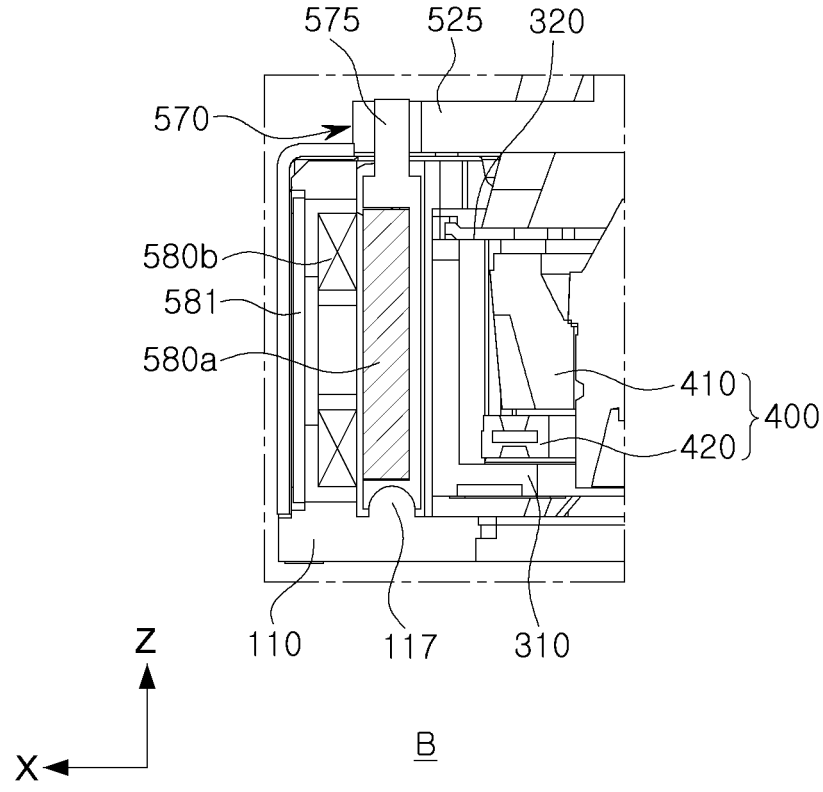
FIG. 9 illustrates an enlarged diagram of a portion B in FIG. 8.
Figure 10A:
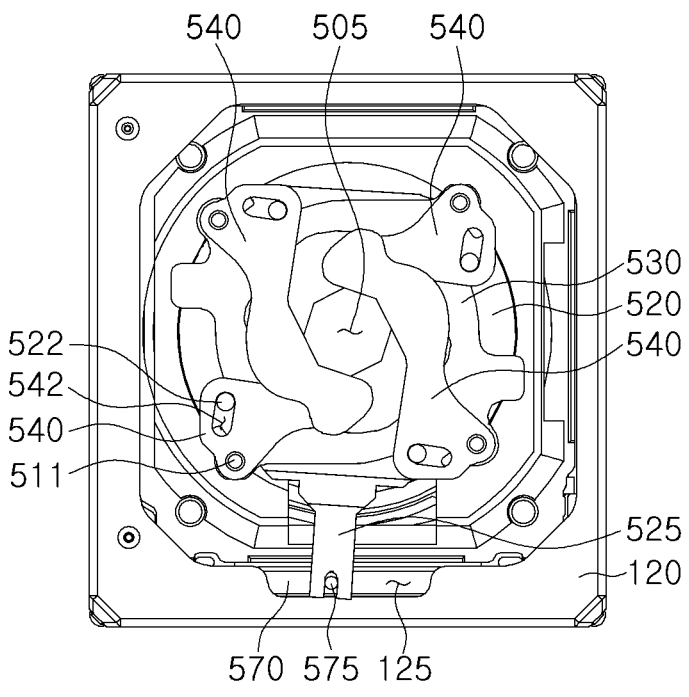
FIG. 10A and FIG. 10B illustrate an example in which a moving holder moves to change a size of an aperture, in accordance with one or more embodiments.
Figure 10B:
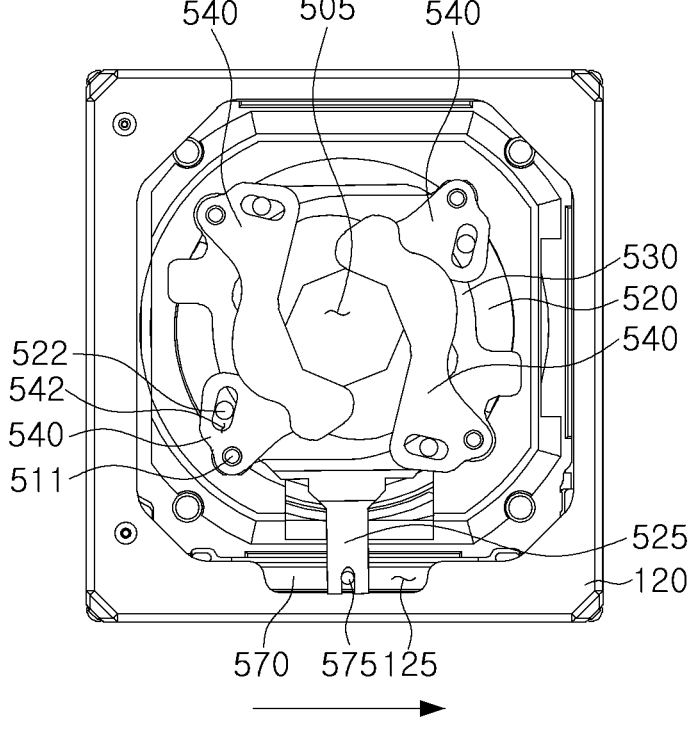
Figure 11:
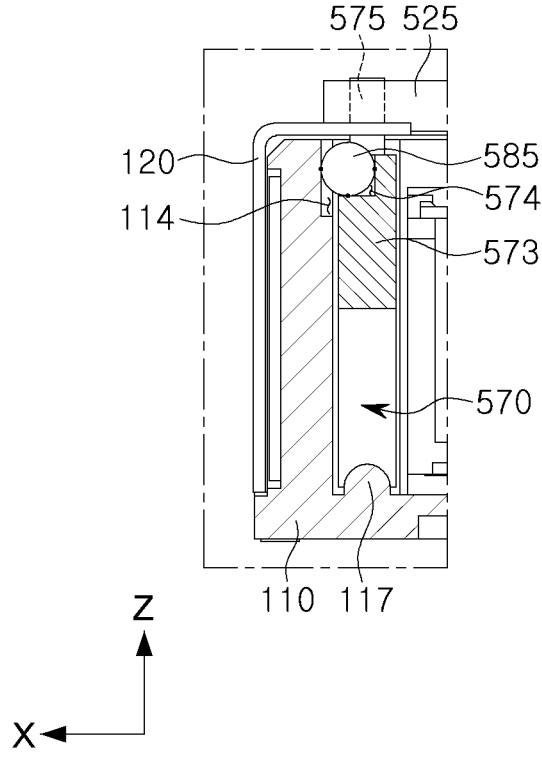
FIG. 11 illustrates a cross-sectional diagram of a stop adjusting rolling member viewed from the side, in accordance with one or more embodiments.
Figure 12:
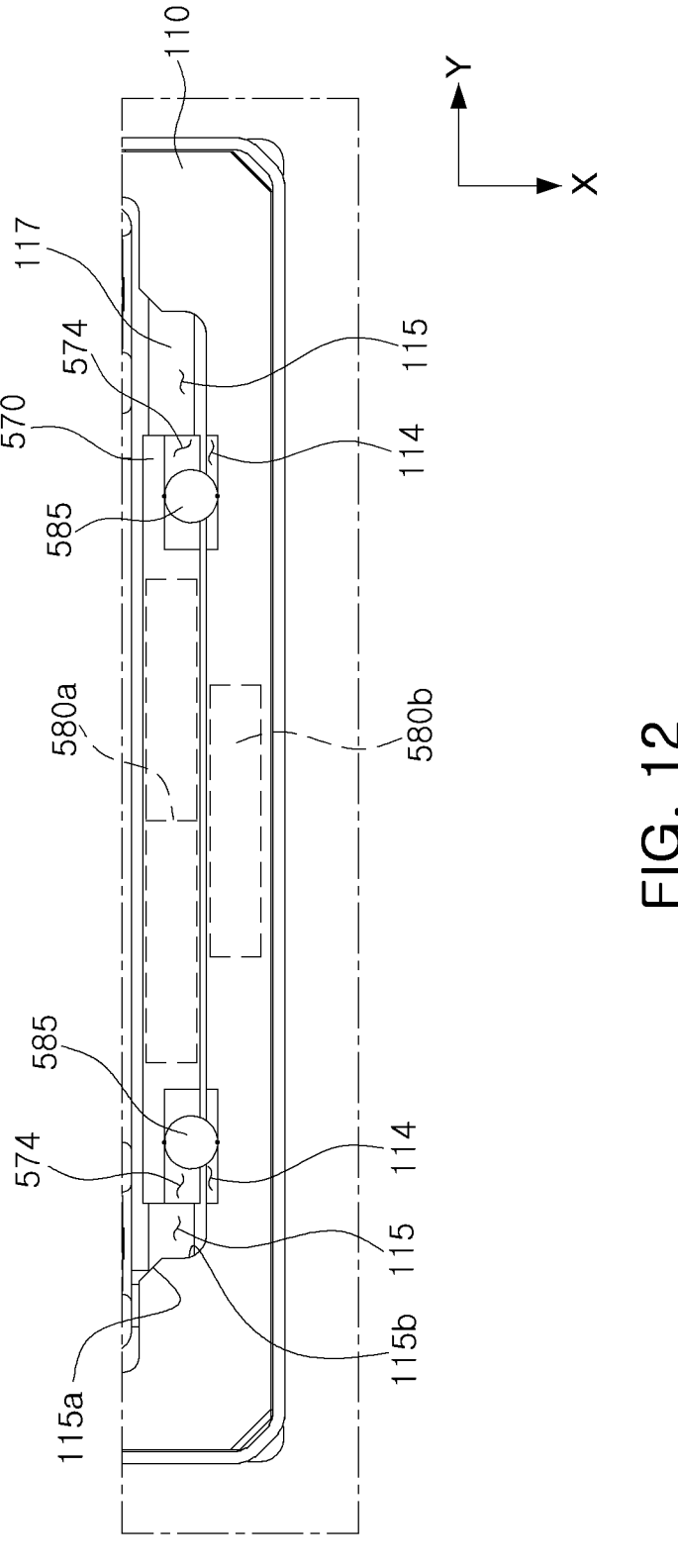
FIG. 12 illustrates a plan cross-sectional diagram of a stop adjusting rolling member, in accordance with one or more embodiments.

FIG. 9 illustrates an enlarged diagram of portion B in FIG. 8. FIG. 10A and FIG. 10B illustrate an example in which a moving holder moves to change a size of an aperture. FIG. 11 illustrates a cross-sectional diagram of a stop adjusting rolling member, in accordance with one or more embodiments, viewed from the side. FIG. 12 illustrates a plan cross-sectional diagram of a stop adjusting rolling member, in accordance with one or more embodiments.

Referring to FIG. 9, FIG. 10A, and FIG. 10B together, the holder driving unit 580 may include a holder driving magnet 580*a* and a holder driving coil 580*b* disposed to oppose the holder driving magnet 580*a*, and the holder driving magnet 580*a* and the holder driving coil 580*b* may oppose each other.

In an example, and referring to FIGS. 1 and 6, the holder driving magnet 580*a* may be mounted on a magnet accommodation groove 571 formed on one surface of the moving holder 570, and the holder driving coil 580*b* may be provided on a substrate 150 mounted on the housing 110, and may be disposed on one surface of the housing 110 facing the one surface of the moving holder 570.

Additionally, the holder driving unit 580 may further include a stop adjusting rolling member 585 to reduce friction when the moving holder 570 moves. The stop adjusting rolling member 585 may be configured as a ball bearing having a ball shape.

In this example, the holder driving magnet 580*a* may be configured as a moving member together with the moving holder 570 in a direction perpendicular to the optical axis, and the holder driving coil 580*b* may be configured as being fixed to the housing, and may not move with the moving holder 570.

When power is applied to the holder driving coil 580*b*, the holder driving unit 580 may move the moving holder 570 in a first direction perpendicular to the optical axis based on an electromagnetic force between the holder driving magnet 580*a* and the holder driving coil 580*b*. That is, the moving holder 570 may move relative to the holder driving coil 580*b* in a direction perpendicular to the optical axis.

Additionally, a holder yoke 581 may be disposed in the housing 110 in a position opposing the holder driving magnet 580*a*. In an example, the holder yoke 581 may be disposed to oppose the holder driving magnet 580*a* with the holder driving coil 580*b* interposed therebetween (see FIG. 9).

Since an attractive force acts between the holder yoke 581 and the holder driving magnet 580*a* in a direction perpendicular to the optical axis direction, the stop adjusting rolling member 585 may maintain the state of being in contact with the moving holder 570 and the housing 110, specifically, the holder rolling groove 574 and the housing rolling groove 114 to be described later (see FIG. 11).

Additionally, the holder yoke 581 may also operate to focus magnetic force of the holder driving magnet 580*a*. Accordingly, leakage magnetic flux may be prevented. In an example, the holder yoke 581 and the holder driving magnet 580*a* may form a magnetic circuit.

The mounting position of the holder driving magnet 580*a* and the holder driving coil 580*b* is not limited to the above example as long as the holder driving magnet 580*a* and the holder driving coil 580*b* have a structure to generate an electromagnetic force to drive the moving holder 570 in a direction perpendicular to the optical axis.

When the moving holder 570 moves in a direction perpendicular to the optical axis, the lever driving shaft 575 may also move in a direction perpendicular to the optical axis, and as the rotating lever 525 of the rotating plate 520 connected thereto rotates, the guide axis 522 of the rotating plate 520 also rotates together. Since the plurality of blades 540 rotate around the blade hole 541 based on the rotation of the guide axis 522, the size of the aperture 505 may be changed (FIG. 10B).

In this example, the recess 125 of the case 120 may be formed in parallel along a moving path (Y axis) of the moving holder and may provide a space for guiding the moving holder 570 to move stably without interfering with an upper surface of the case 120.

Referring to FIGS. 11 and 12 together, the side surface of the housing 110 and the moving holder 570 may include a stop adjusting rolling groove (which may include a housing rolling groove 114 formed by recessing one surface of the housing 110 opposing the moving holder 570 and a holder rolling groove 574 formed on the moving holder 570) recessed into one surface opposing each other, and a stop adjusting rolling member 585 may be disposed on the holder rolling groove.

The stop adjusting rolling groove may include a housing rolling groove 114 formed by recessing one surface of the housing 110 opposing the moving holder 570 and a holder rolling groove 574 formed on the moving holder 570.

The holder rolling groove 574 may be formed by recessing the holder extension portion 573 extending to both sides of the magnet accommodation groove 571.

The stop adjusting rolling member 585 may be supported by the stop driving rolling groove by at least three points. In an example, the stop adjusting rolling member 585 may be in one-point contact with the housing rolling groove 114 and may be in two-point contact with the holder rolling groove 574.

Additionally, a center of the stop adjusting rolling member 585 may overlap the holder rolling groove 574 in the optical axis direction. Accordingly, the stop adjusting rolling member 585 may be stably seated on the stop adjusting rolling groove and may move.

In an example, a cross-sectional surface of a side surface of the holder rolling groove 574 may have an "L" shape, such that each of the lower surface and the side surface of the stop adjusting rolling member 585 may be in contact with the holder rolling groove 574 (see FIG. 11).

Accordingly, even when the stop adjusting rolling member 585 is disposed between the housing 110 and the moving holder 570, a spacing distance between the housing 110 and the moving holder 570, which may be formed by disposing the stop adjusting rolling member 585, may be reduced.

Referring to FIG. 11, the stop adjusting rolling member 585 may be in three-point contact. However, the upper portion of the stop adjusting rolling member 585 may be in contact with the case 120 by one more point such that four-point contact may be implemented.

For example, referring to FIG. 11, the stop control rolling member 585 may be in one-point contact with the housing rolling groove 114, may be in two-point contact with the holder rolling groove 574, and may be in one point contact with the case 120.

When the component is in four-point contact as above, the stop adjusting rolling member 585 may support the upper portion of the moving holder 570. When the focusing unit 300 is driven and the stop caliber unit moves upwardly in the optical axis direction, the moving holder 570 may be prevented from moving up based on friction between the lever hole 426 of the rotating lever 425 and the lever driving shaft 575 of the moving holder 570. Also, in this example, the stop adjusting rolling member 585 may more stably perform a rolling motion between the housing rolling groove 114 and the holder rolling groove 574.

The housing 110 may have a holder guide groove 115 provided to accommodate at least a portion of the moving holder 570 (see FIG. 12). Specifically, an internal side surface of the housing 110 opposing the moving holder 570 moving in the first direction may be recessed in a second direction perpendicular to the first direction, the holder guide groove 115 may be formed.

The moving holder 570 may be disposed at least in the holder guide groove 115 of the housing 110, may reduce the spacing distance between the moving holder 570 and the housing 110 and may reduce the space occupied by the moving holder 570 in the internal space of the housing 110.

Additionally, the holder guide groove 115 may be formed by recessing one surface of the housing 110 opposing the moving holder 570, and may extend in the first direction to move in the first direction while at least a portion of the holder guide groove 115 is accommodated.

The holder guide groove 115 may be provided with a first notch 115*a* and a second notch 115*b* of which both ends may be cut out to avoid interference with the moving holder 570.

Also, the housing 110 may include a holder guider 117 that supports the moving holder 570 in a lower portion of the holder guide groove 115. The holder guider 117 may protrude upwardly in the optical axis direction toward the holder guide groove 115, and a guider groove (not illustrated) in which the holder guider 117 is accommodated may be formed in a lower portion of the moving holder 570, and the holder guider 117 may be inserted thereto.

The holder guider 117 may extend in the first direction and may guide the movement of the moving holder 570 in the first direction.

Additionally, the portion of the holder guider 117 in contact with the lower portion of the moving holder 570 may be formed as a curved surface, such that friction generated between the holder guider 117 and the guider groove of the moving holder 570 may be reduced.

As described above, a guider groove may be formed in the lower surface of the moving holder 570, and the holder guider 117 may be inserted to form surface contact, or a lower surface of the moving holder 570 may be in contact with the curved surface of the holder guider 117 to form a line contact. That is, as long as the moving holder 570 may be supported by the holder guider 117, the supporting structure of the moving holder 570 and the holder guider 117 is not limited to surface contact and line contact.

According to the aforementioned example embodiments, the camera module may reduce the driving load of the autofocusing function which may occur by implementation of the stop module.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A camera module, comprising:
a housing;
a focusing unit accommodated in the housing, and configured to move in an optical axis direction, and having a lens barrel therein;
a stop caliber unit which has an aperture through which light incident to the lens barrel passes; and
a stop adjusting unit, connected to the stop caliber unit, and configured to change a size of the aperture,
wherein the stop caliber unit is configured to move relative to the stop adjusting unit in the optical axis direction.

2. The camera module of claim 1, wherein the stop caliber unit is coupled to the focusing unit and is configured to move in the optical axis direction together with the focusing unit.

3. The camera module of claim 2, wherein, when the focusing unit moves in the optical axis direction, movement of the stop adjusting unit is limited in the optical axis direction.

4. The camera module of claim 1, wherein the stop adjusting unit is provided to move relative to the stop caliber unit in a first direction perpendicular to the optical axis direction.

5. The camera module of claim 4,
wherein the stop adjusting unit includes a moving holder provided to move in the first direction and connected to the stop caliber unit,
wherein, when the moving holder moves in the first direction, a size of the aperture changes.

6. The camera module of claim 5,
wherein the stop adjusting unit comprises:
a holder driving magnet accommodated in the moving holder; and
a holder driving coil, disposed to oppose the holder driving magnet, and configured to generate a driving force to the holder driving magnet in the first direction,
wherein the moving holder is configured to move in the first direction relative to the holder driving coil.

7. The camera module of claim 5,
wherein the stop caliber unit comprises:
a rotating plate connected to the moving holder and configured to rotate; and
a plurality of blades configured to rotate together with the rotating plate and configured to form the aperture with different sizes, and
wherein, the rotating plate is configured to rotate when the moving holder moves in the first direction.

8. The camera module of claim 7,
wherein the rotating plate comprises a rotating lever which extends in a direction toward the moving holder,
wherein the moving holder comprises a lever driving shaft that is configured to connect to an end of the rotating lever, and
wherein the end of the rotating lever is configured to move in the optical axis direction relative to the lever driving shaft.

9. The camera module of claim 8, wherein the end of the rotating lever is configured to move in the first direction together with the lever driving shaft.

10. The camera module of claim 9, wherein the lever driving shaft protrudes upwardly in the optical axis direction, and wherein a lever hole, configured to accommodate at least a portion of the lever driving shaft in the optical axis direction, is provided on the end of the rotating lever.

11. The camera module of claim 5, further comprising:

a stop adjusting rolling groove comprising a housing rolling groove formed on a first surface of the housing opposing the moving holder, and a holder rolling groove formed on the moving holder to oppose the housing rolling groove; and a stop adjusting rolling member disposed in the holder rolling groove and configured to support a movement of the moving holder in the first direction, wherein the stop adjusting rolling member is in contact with the stop adjusting rolling groove at a minimum of three points.

12. The camera module of claim 11, wherein a lower portion of the stop adjusting rolling member is in contact with the holder rolling groove, such that a center of the stop adjusting rolling member overlaps the moving holder in the optical axis direction.

13. The camera module of claim 12, wherein a cross-sectional surface of the holder rolling groove has an "L" shape in the first direction, and wherein the stop adjusting rolling member is in two-point contact with the holder rolling groove.

14. The camera module of claim 5, wherein the housing comprises a holder guide groove provided to accommodate at least a portion of the moving holder in a second direction perpendicular to the first direction, and wherein the holder guide groove extends in the first direction along a movement path of the moving holder.

15. The camera module of claim 14, wherein the housing further comprises a holder guider provided below the holder guide groove and configured to support a lower portion of the moving holder, wherein the holder guider protrudes upwardly in the optical axis direction such that at least a portion of the holder guider is inserted into a lower portion of the moving holder, and wherein the holder guider extends in the first direction along a moving radius of the moving holder and guides movement of the moving holder.

16. The camera module of claim 2, wherein, when the focusing unit moves in the optical axis direction, a distance between the aperture and the lens barrel in the optical axis direction is constant.

17. An electronic device comprising the camera module of claim 1.

18. A camera module, comprising:

a housing;

a stop caliber unit configured to move in an optical axis direction, which has an aperture through which incident light passes; and a stop adjusting unit, connected to the stop caliber unit, and configured to change a size of the aperture, wherein the stop caliber unit is configured to move relative to the stop adjusting unit in the optical axis direction.

19. The camera module of claim 18, wherein the stop adjusting unit is provided to move relative to the stop caliber unit in a first direction perpendicular to the optical axis direction to change a size of the aperture.

20. The camera module of claim 19, wherein the stop caliber unit comprises a rotating lever to change a size of the aperture, wherein the stop adjusting unit comprises a lever driving shaft configured to move in the first direction, wherein the lever driving shaft protrudes upwardly in the optical axis direction, and wherein a lever hole, configured to accommodate at least a portion of the lever driving shaft in the optical axis direction, is provided on the end of the rotating lever.

* * * * *